May 3, 1966     B. STEVENS, JR     3,248,979
SYSTEM FOR DETECTING METAL IN A MOVING WEB
Filed April 13, 1964
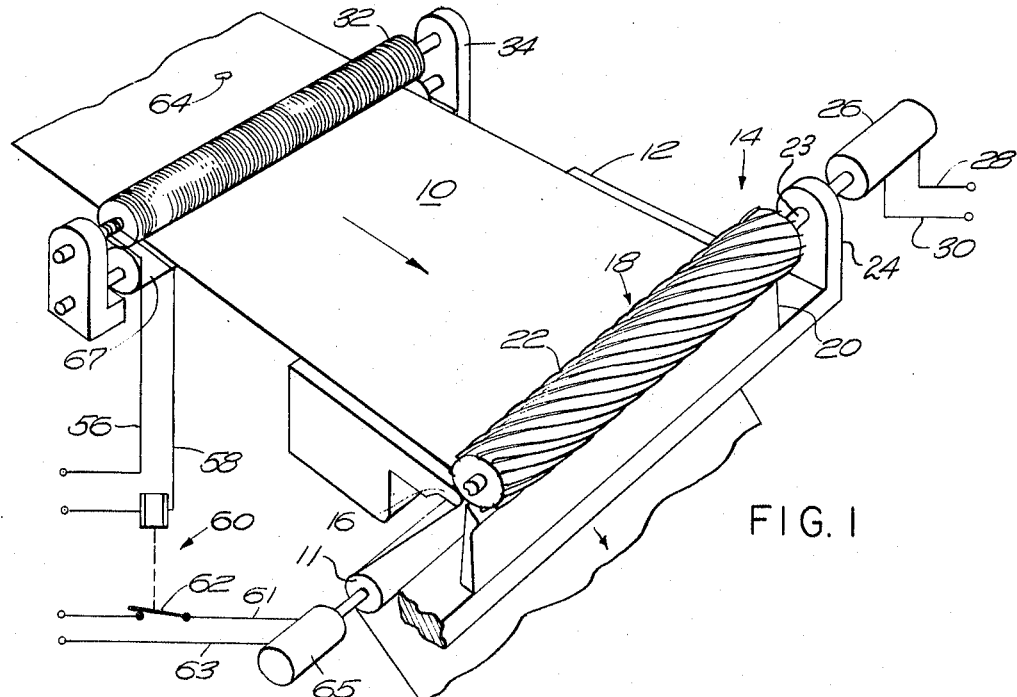
FIG. 1
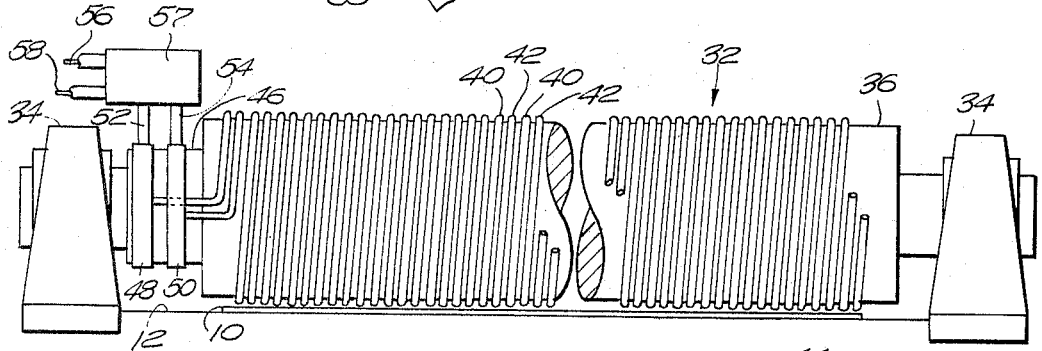
FIG. 2
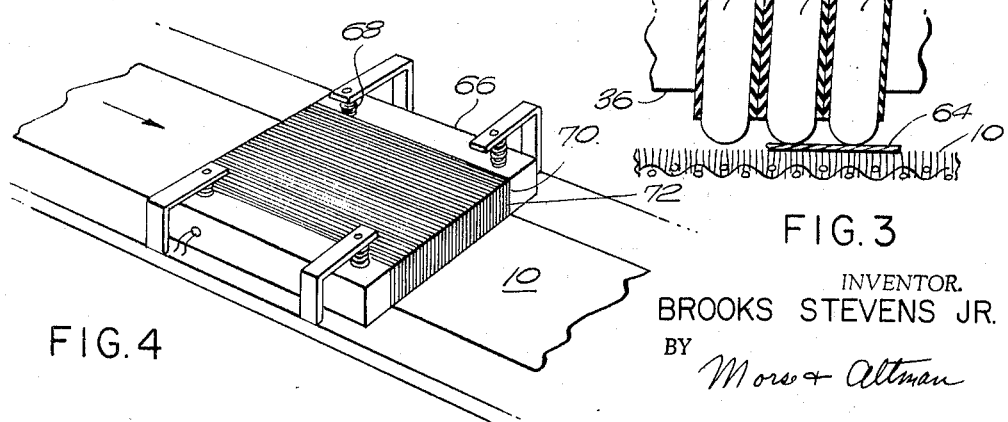
FIG. 3
FIG. 4
INVENTOR.
BROOKS STEVENS JR.
BY Morse & Altman
ATTORNEYS United States Patent Office 3,248,979
Patented May 3, 1966

3,248,979
SYSTEM FOR DETECTING METAL IN A
MOVING WEB
Brooks Stevens, Jr., Concord, Mass., assignor to Riggs &
Lombard, Inc., Lowell, Mass., a corporation of
Massachusetts
Filed Apr. 13, 1964, Ser. No. 359,121
3 Claims. (Cl. 83—58)

This invention relates generally to a system for detecting extraneous metal fragments on a moving web and more particularly is directed towards a new and improved system for protecting textile shearing blades from damage by metal particles embedded or attached to fabrics that are being sheared.

In the manufacture of fabrics, rotary shear blades, co-acting with stationary ledger knives, are employed to shear the protruding fibers on the cloth surface to a uniform level. The shearing mechanism is usually operated at a high speed with the cloth being run rapidly through the machine and past the co-acting blades in flat and open relation. The cloth is customarily supported in close proximity to the blades by means of a rest positioned adjacent to the ledger knife and shearing blades.

From time to time an extraneous metal fragment accidentally will become attached to or embedded in the fabric before it reaches the shearing station. If the metal fragment is carried into the narrow gap between the rest and the shearing mechanism, the cutting blades will be damaged. If the blades are nicked, the finish of the sheared fabric will be irregular and it will be necessary to stop the machine for repairs. If it is necessary to replace the entire rotary shear, considerable expense and delay is involved since rotary cutters of this type are relatively large, precision made and quite expensive.

Various measures have been taken to detect the presence of metal particles in or on a moving web in advance of passing the web through a shearing mechanism but heretofore none has been entirely effective in detecting these fragments.

Accordingly, it is an object of the present invention to provide an improved system for detecting metal fragments in a moving web.

Another object of this invention is to provide an improved system for protecting the cutting elements of a fabric shearing machine from metal fragments carried by a moving web.

More particularly, this invention features a system for detecting metal fragments on a moving web and protecting shearing blades from damage by the same comprising a fixed or rotatable support extending transversely across the path of the web and carrying a plurality of electrical leads extending generally parallel or at a slight angle to the length of the web and mounted in close proximity to one another. Adjacent leads are electrically insulated one from the other while the outer surfaces are exposed for contact with the web. Alternate leads are joined to separate conductors connected to a power source and also in circuit with a device such as a relay for controlling the advance of the web or for temporarily retracting a rotary cutter and ledger knife from close proximity to the web. When a metal fragment is carried by the web into contact with the detecting unit, a circuit will be completed between adjacent leads by the action of the fragment bridging the normally insulated leads. This will actuate the relay which in turn will cause the web advance mechanism to stop or retract the rotary shear and ledger knife before the metal fragment reaches the shearing station.

But these and other features of the invention, along with further objects and advantages thereof, will become more fully apparent from the following detailed description of preferred embodiments of the invention, with reference being made to the accompanying drawings, in which FIG. 1 is a view in perspective, somewhat schematic, of a metal fragment detecting and shearing blade protection system made according to the invention, FIG. 2 is a view in front elevation of the detecting roller shown in FIG. 1, FIG. 3 is a front elevation of the FIG. 2 roller showing details thereof on an enlarged scale, and FIG. 4 is a view in perspective of a modified metal fragment detecting device.

Referring now to FIGS. 1 to 3 of the drawings, the reference character 10 generally indicates a fabric web which is advanced by a feed roller 11 over a support 12 to a cloth shearing station 14. Typically the shearing station includes a rest 16 about which the web is passed to carry it into proximity with a rotary shearing member 18 which co-acts with a ledger knife 20 to shear the upstanding threads on the web to a uniform height.

Rotary shearing members of this type generally include a series of spaced cutting blades 22 helically mounted about a cylindrical tube supported at its end by gudgeons 23 carried in bearings 24. A motor 26 customarily is provided to drive the shearing member 18 either directly or through a pulley or gear arrangement. Leads 28 and 30 connect the motor 26 to a suitable power source.

Since the rotary shearing member 18 rotates in close relationship to the ledger knife 20, any particles of metal which might be accidentally carried by the web 10 could chip, dull or otherwise injure the blades 22 and the ledger knife 20. In order to prevent such extraneous metal fragments from entering into the shearing mechanism, a detecting roller 32, supported for free rotation at its ends by bearings 34, extends transversely across the web 10. The detecting roller has sufficient length to cover the entire width of the web 10 and comprises a cylinder 36 which may be a rubber covered roll or a cylindrical tube, for example, and about which a pair of wire leads 40 are spirally wound in close proximity to one another throughout the entire length of the cylinder. The leads 40 and 42 are electrically insulated from each other throughout all of their convolutions by insulation 44. However, the outer surfaces of the leads 40 and 42 are exposed for contact with the web which passes under the detecting roller 32. The leads 40 and 42 pass axially outward from the roller into a hub 46 which carries a pair of slip rings 48 and 50 connected to the leads 40 and 42 respectively. A pair of brushes 52 and 54, carried by a holder 57, ride against the slip rings 48 and 50 and are provided with leads 56 and 58 which connect to a suitable power source and to a relay 60. The relay in turn controls a normally closed switch 62 in a circuit including leads 61 and 63 for energizing a drive motor 65 for the web feed roller 11.

It will be understood that a metal fragment 64, carried along by the web 10, will pass beneath the detecting roller 32 and will bridge the spirally wound exposed leads 40 and 42, closing the circuit to the relay 60. This, in turn, will open the switch 62 to halt the drive motor 65 and stop the advance of the web prior to its reaching the rotary shearing member 18. To insure good contact between the detecting roller and the web, the detecting roller may be so positioned that it breaks the line of the web travel, causing the web to wrap about the detecting roller to a certain extent. Alternatively, an idler roller 67 (FIG. 1) may be mounted oppositely the detecting roller 32 to hold the web against the detecting roller.

In order to increase the sensitivity of the detecting roller to the presence of small or thin particles the leads 40 and 42 may be double or triple wound in a spiral of increased pitch. This will have the effect of orienting the leads more on the diagonal with respect to the advance of the web to insure that a fragment such as a needle, for example, will bridge at least two adjacent leads as it passes under the detecting roller.

Referring now more particularly to FIG. 4 there is shown a modification of the invention and in this embodiment a flat rectangular platen 66 extends transversely across the web 10 and is resiliently supported at each corner by means of a spring so that the platen rides against the web surface. A pair of windings 70 and 72 are distributed in spiral fashion across the length of the platen 66 and as before, the leads are electrically insulated one from another with their outer surfaces exposed at least on that side of the platen facing the web 10. The leads extend generally parallel to the path of travel of the web although they may be laid somewhat diagonally with respect to the web in order to insure that a metal particle passing underneath will bridge at least two open leads.

While the invention has been described with particular reference to the illustrated embodiments, it will be understood that numerous modifications thereto will appear to those skilled in the art. For example, a metal detector either in the roll form or the platen form may be located on both sides of the traveling web in order to detect extraneous metal particles clinging to either surface. The circuits of the two detectors would be integrated so that a pulse from either detector will stop the advance of the web prior to the detected fragments reaching the shearing station. Also it will be understood that the above description and accompanying drawings should be taken as illustrative of the invention and not in a limiting sense.

Having thus described the invention, what I claim and desire to obtain by Letters Patent of the United States is:

1. Apparatus for detecting extraneous metal fragments on a moving web, including a support extending transversely across the path of said web, a plurality of electrically conductive leads wound spirally about the outer surface of said support substantially the full length thereof and in close proximity to one another, electrical insulating means disposed between adjacent leads, the outer surfaces of said leads being exposed for contact with said web, first conducting means constituting one portion of an electrical circuit connected to alternate conductive leads and second conducting means constituting another portion of said circuit connected to the remaining leads whereby said circuit will be completed by a metal fragment on said web bridging said leads.

2. Apparatus according to claim 1 wherein said support is in the form of a roller and said conductive leads are disposed about the outer cylindrical surface thereof.

3. In combination a mechanism for shearing the surface of a web, power means for moving said web through said shearing mechanism and an apparatus for detecting extraneous metal fragments in said web prior to reaching said shearing mechanism, including a roller extending transversely across the path of said web and ahead of said shearing mechanism, including a roller extending transversely across the path of said web and ahead of said shearing mechanism, a plurality of electrically conductive leads wound spirally about said roller substantially the full length thereof and in close proximity to one another, means electrically insulating adjacent leads, the outer surfaces of said leads being exposed for contact with said web, slip rings mounted on said roller, said leads being connected to said rings, wiper arms engaging said rings, first conducting means constituting one portion of an electrical circuit operatively connected to said power means and connected through said wiper arms and rings to alternate conductive leads and second conducting means constituting another portion of said circuit connected through said wiper arms and rings to the remaining leads whereby said circuit will be completed by a metal fragment on said web bridging any two adjacent leads, and means responsive to the completion of said circuit for halting the advance of said web.

References Cited by the Examiner

UNITED STATES PATENTS

| 701,248 | 5/1902 | Bannon | 200—61.41 X |
| 1,827,349 | 10/1931 | Bing | 192—127 |
| 2,321,482 | 6/1943 | Hadley | 26—17 |

ANDREW R. JUHASZ, *Primary Examiner.*